J. BAAR.
RESILIENT TIRE.
APPLICATION FILED JUNE 17, 1908.
962,297.
Patented June 21, 1910.
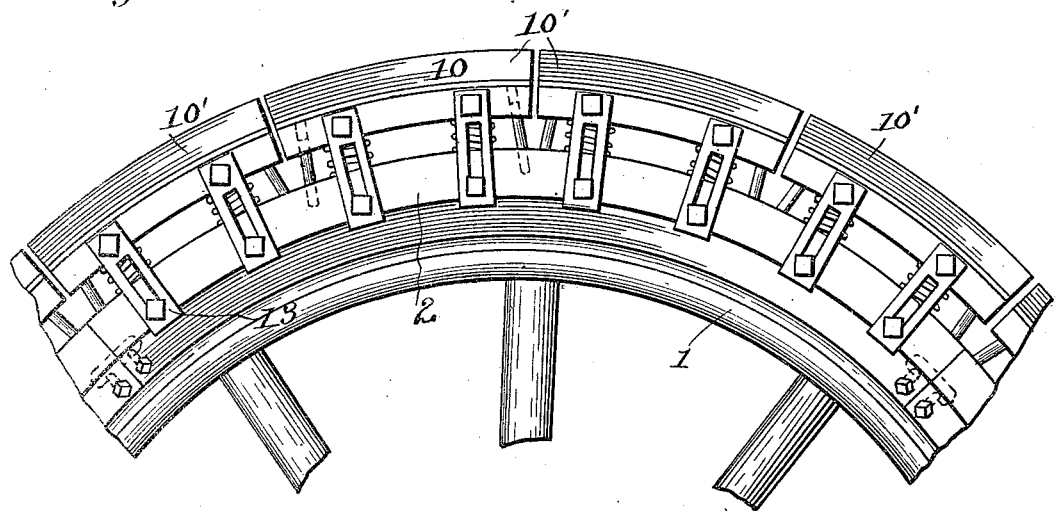
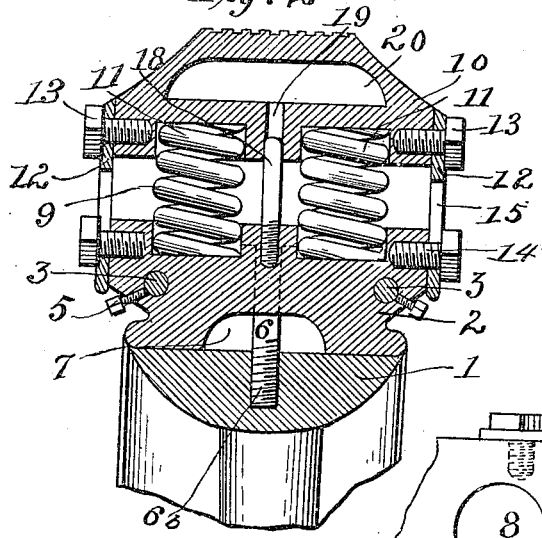
Witnesses
C. M. Walker
Iw. L. M<sup>c</sup>Cathran
Inventor,
John Baar
By E. E. Vrooman,
his Attorney.

UNITED STATES PATENT OFFICE.

JOHN BAAR, OF PHILADELPHIA, PENNSYLVANIA.

RESILIENT TIRE.

962,297.

Specification of Letters Patent. Patented June 21, 1910.

Application filed June 17, 1908. Serial No. 439,023.

*To all whom it may concern:*

Be it known that I, JOHN BAAR, a citizen of the United States, residing at Philadelphia, in the county of Philadelphia and State of Pennsylvania, have invented certain new and useful Improvements in Resilient Tires, of which the following is a specification, reference being had therein to the accompanying drawing.

This invention relates to improvements in tires, and more particularly to metal tires of a resilient type.

The main object of this invention is the production of a resilient tire of metallic construction, formed in sections, and so supported from the wheel-rim as to readily yield under the influence of any jar or the like.

Another object of this invention is the provision of means for facilitating the fastening of the sections of the rim together.

With these and other objects in view, this invention consists of certain novel constructions, combinations and arrangements of parts as will be hereinafter fully described and claimed.

In the drawings: Figure 1 is a view, in side elevation, of a portion of a wheel provided with my improved tire. Fig. 2 is a transverse, sectional view of the tire. Fig. 3 is a fragmentary top plan view of one of the tread-sections and the rim. Fig. 4 is a fragmentary top plan view of the rim-section, showing the connecting means of said sections.

Referring to the drawings by numerals, 1 designates a felly which carries a rim portion 2, said rim portion being made up of sections. These sections are securely held together by means of pins 3, which are positioned in registering apertures 4, said apertures being positioned on each side of said rim portion, and these pins are securely held in the apertures 4 by means of thumb-screws or bolts 5. The rim-sections are fastened to the felly by means of bolts 6, which have their heads 6ª positioned in sockets 6' in the outer surface of said rim-portion, and their lower screw-threaded ends 6ᵇ engaging the felly. A hollow portion 7 is formed in the under surface of the rim-portion to reduce the weight of said rim and also the cost of manufacture. In the upper surface of the rim-portion there are two rows of cylindrical recesses or socket portions 8, into which are positioned one end of the coil springs 9. These rows of holes or sockets extend around the entire circumference of the rim and are positioned on each side of the securing bolts 6. The coil springs 9 are used to support the tread-portion 10, which is made up of a number of sections 10'. The upper ends of the coil springs 9 are positioned in sockets or recess portions 11, formed similar to the sockets 8 in the upper surface of the rim-portion 2. The tread-portion 10 and the rim-portion 2 are connected by means of plates 12, said plates 12 are fastened to the outer edge of the tread-portions 10 by means of bolts 13, and are secured to the rim-portion by means of bolts 14. The bolts 14 work in longitudinally-extending slots 15 in the plates 12, thus allowing the tread-portion 10 to yield to any unevenness of the road over which the tire is traveling. Between the two rows of sockets for the reception of the coil springs are positioned a number of pins 18, which have their lower ends 17 screw-threaded into the upper surface of the rim-portion 2, and their upper ends 18 sliding in an aperture 19 in the tread-portion 10. The apertures 19 of the tread-portion 10 open into an opening or recess portion 20, so as to allow the pins 16ª greater upward movement.

It will be noted that in Fig. 1 the pins 16 are disposed at such an angle so as to allow the tread-sections 10' to freely move upon said pins. The sections 10' are spaced a slight distance from each other so as to prevent any jamming. The pins 16 prevent any forward or backward movement of the tread-sections 10', whereas the plates 12 prevent any lateral movement of the same. Therefore, it will be obvious that the tire will readily yield to any obstruction upon the road over which it is traveling, and also prevent the tread-portion 10 from being shifted to one side of the rim-portion 2.

What I claim is:

1. A tire, comprising a plurality of rim-sections, said rim-sections provided with registering recesses positioned in the abutting ends thereof, a plurality of tread-sections supported by said rim-sections, cushion means for normally exerting an outward pressure upon said tread-sections, means for preventing movement of said tread-sections other than that provided by said cushion means, and means for connecting said rim-sections together, said connecting means comprising pins positioned in said registering recesses in the abutting ends of said rim-sections, and bolts having their inner ends engaging said pins for securely holding said pins in said registering recesses.

2. A device of the character described, comprising a felly, inner rim-portions carried by said felly, a plurality of tread-sections surrounding said rim-portions, each two contacting rim-sections provided, at their adjoining edges with registering sockets, a member positioned in said registering sockets, at the adjoining ends, fastening means carried by said sections, near their ends, and adapted to lock said members in said sockets, a tread-section positioned upon said rim-section, and means for yieldably supporting said tread-sections upon said rim-sections.

3. In a device of the class described, the combination with a felly, of a rim section, a tread-section carried by said rim-section, said tread-section provided with a central guide, spring-receiving sockets upon opposite sides of said guide, means for securing said guide in the rim-section, an outer section provided with a socket for receiving said guide, and with spring-receiving sockets upon opposite sides of said guide, and means securing said sections together and springs positioned between said outer and inner sections and having their ends positioned in spring-receiving sockets of said sections.

4. A tire, comprising a plurality of rim-sections, said rim-sections provided with registering recesses, formed in the abutting ends thereof, pins positioned in said recesses, bolts positioned in said rim-sections, and adapted to engage said pins at one end, for normally holding said pins in said registering recesses and thereby holding the rim-sections together, a plurality of tread-sections supported by said rim-sections, cushion means for normally exerting an outward pressure upon said tread-sections, other than that provided by said cushion means, said means comprising a plurality of vertically-extending pins screw-threaded at their lower ends into the upper face of said rim-sections, said tread-sections provided with a plurality of apertures formed in the under face thereof, and adapted to receive the upper ends of said vertically-extending pins for allowing said tread-sections to move longitudinally of said pins, and means secured to said rim-sections and to said tread-sections for limiting the upward movement of said tread-sections.

5. A tire, comprising a plurality of rim-sections, said rim-sections provided with a plurality of registering recesses formed in the abutting ends thereof, pins positioned in said registering recesses, bolts positioned through said rim-sections and engaging said pins for holding the same in said registering recesses, and thereby holding the rim-sections together, a plurality of tread-sections supported by said rim-sections, cushion means interposed between said rim-sections and tread-sections for normally exerting an outward pressure upon said tread-sections, said tread-sections provided with a longitudinally extending centrally-located slot with a transversely extending aperture or recess communicating with said longitudinally extending slot, a plurality of vertically extending pins, fixedly secured at their inner ends to said rim-sections and slidably mounted in said transversely extending apertures for allowing said tread-sections to move freely thereon and means securing said rim-sections to the tread-sections for limiting the upward movement of said tread-sections.

6. A tire, comprising a plurality of rim-sections, means securing said rim-sections together, a plurality of tread-sections yieldably supported upon said rim-sections, said yieldable supporting means comprising a plurality of rows of spring-members, having their ends positioned in sockets formed in the adjacent faces of said rim-sections and tread-sections, said tread-sections provided with transversely extending apertures, pins fixedly secured at their inner ends to said rim-sections and working at their outer ends in said transversely extending apertures and preventing the backward or forward movement of said tread-sections, said pins positioned between said spring-members, and bolt-members provided with enlarged heads adapted to be secured in sockets formed in the upper face of said rim-sections and adapted to pass therethrough and being screw-threaded into the felly for securing said rim-sections to said felly.

In testimony whereof I hereunto affix my signature in presence of two witnesses.

JOHN BAAR.

Witnesses:
CHARLES BAAR,
FRANK MRKWA.